July 20, 1943.  K. H. BOWEN ET AL  2,324,466
SPONGE RUBBER AND METHOD OF MAKING SAME
Filed Sept. 26, 1940
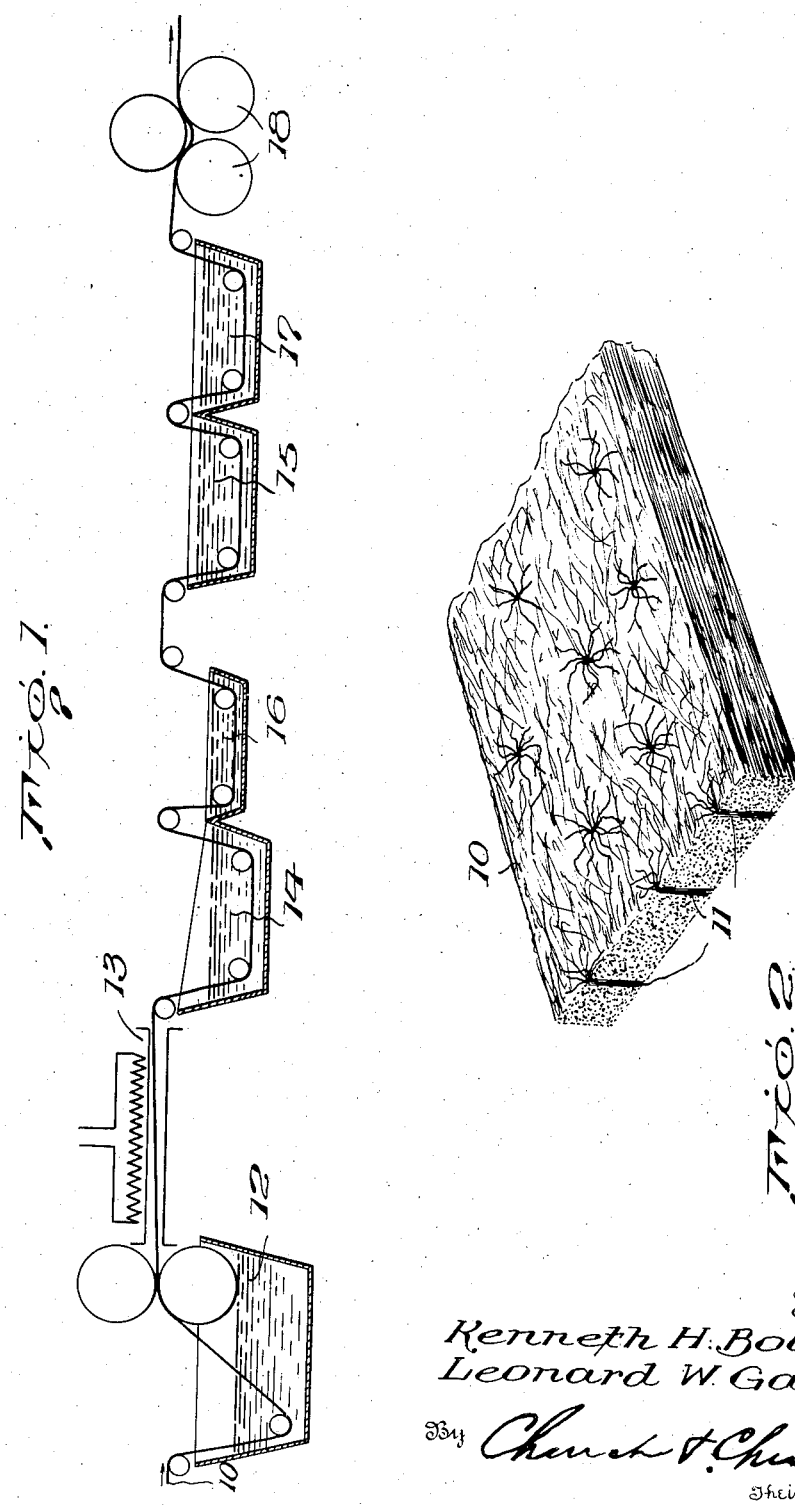
Inventors
Kenneth H. Bowen
Leonard W. Gane
By Church & Church
Their Attorneys Patented July 20, 1943

2,324,466

UNITED STATES PATENT OFFICE 2,324,466

SPONGE RUBBER AND METHOD OF MAKING SAME

Kenneth H. Bowen and Leonard W. Gane, Auburn, N. Y., assignors to Columbian Rope Company, Auburn, N. Y., a corporation of New York Application September 26, 1940, Serial No. 358,528

1 Claim. (Cl. 18—48)

This invention relates to sponge rubber and method of producing the same.

One object is to provide a method of making sponge rubber material in continuous lengths.

Another object is to provide a sponge rubber material, and method of making the same, wherein the porosity of the material and articles made therefrom can be rather accurately controlled.

A further object is to provide a method of making sponge rubber articles wherein the material constituting the article can be shaped to the desired size and contour before it is treated for rendering it porous. Specifically, a material coated with rubber is molded or shaped into the desired article and is then treated to remove said material, leaving the article composed essentially of the rubber without substantially altering the size or shape of the article.

Still another object is to provide a method of manufacturing sponge rubber wherein the density or porosity can be readily varied without detracting from the degree of accuracy with which the porosity of ultimate products is controlled.

Another object is to produce a sponge rubber wherein the rubber composition is formed into small tubular portions or sections connected to one another, these tubular portions constituting elongated pores with the porosity of the mass as a whole being augmented if desired by said tubular portions being associated with one another in what, for convenience, has been termed an intersticed relationship. Preferably, in carrying out the present invention, a mass of filamentary elements, for instance, vegetable fibers, is formed into a web or other body of suitable shape and the elements or fibers coated with a rubber composition so that, when the rubber coating is cured and the elements or fibers removed, there will remain the mass of small rubber tubes. Thus, the fibers or other filaments in effect constitute cores for the formation of elongated, tubular pores. By varying the size of the fibers or filaments or by varying the density to which they are compacted before being coated, sponge rubber articles of varying porosity can readily be produced. Also, the removal of the fibers or filaments is effected in a manner which permits any desired percentage thereof to be left in the ultimate product whereby the tensile strength of the product, as well as its porosity, can likewise be varied at will. In other words, by varying the extent to which the fibers or other filaments are removed from their coatings, the voids in the tubular sections formed by said coatings can be varied in size, smaller voids decreasing the porosity or sponginess of the mass and larger voids increasing the porosity. Similarly, as the density of the mass of fibers or filaments is increased, the smaller will be the voids or interstices between them and, consequently, the porosity of the finished product will be correspondingly reduced. On the other hand, with less compactness in the mass, the voids or interstices between the fibers or filaments will be of larger size and the porosity of the article correspondingly increased.

With these and other objects in view, the invention consists in certain details of construction and combinations and arrangements of parts, all as will hereinafter be more fully described and the novel features thereof particularly pointed out in the appended claim.

In the accompanying drawing—

Figure 1 illustrates more or less diagrammatically one form of apparatus for producing sponge rubber in accordance with the present invention; and Fig. 2 illustrates a body of fibers representing a section of a web of filamentary elements that functions as a carrier for the rubber composition in forming sponge rubber according to the present invention.

Generally stated, the present invention consists in forming a multiplicity of filamentary elements into a body and coating those elements with a rubber composition after which the rubber coating is cured and the filaments removed, so that the lengths of rubber which have been molded, so to speak, on the filamentary cores are left to form elongated pores which impart porosity to the resultant mass, the porosity of which can be varied either by altering the size of said pores or by varying the density of the body of filamentary elements before the rubber composition is cured. For removing the filamentary elements, they are treated with a suitable agent for disintegrating them but which will not detrimentally affect the rubber coating and the extent of the removal or disintegration of said elements is controlled by subsequently treating them with a second agent that will neutralize the action of the disintegrating agent and which will, of course, also have no detrimental effect on the rubber.

For instance, in the example illustrated in the accompanying drawing, a mass of vegetable fibers is formed into a web 10 which, if desired, may be preliminarily passed through a so-called needling machine of the type disclosed in United States Letters Patent to Bettison, No. 1,800,499, so as to interlace the fibers with small groups or tufts of fibers 11 extending transversely through the web. This so-called needling of the web not only facilitates manipulation of the mass of fibers during their treatment in the present apparatus, but, in addition, the presence of groups of tufts of fibers formed in the web is advantageous in certain uses of the finished product.

The web of fibers which may be formed in a continuous length is treated with a rubber composition to coat the fibers, as by passing it through a bath 12 of latex or other suitable rubber composition, after which the rubber coatings on the fibers are at least partially cured. For this purpose, the web may be passed through a heating oven 13. Suitable vulcanizing agents can be incorporated in the latex bath and, as will appear in the following description, subsequent steps in the present method of treating the coated material also aid in vulcanizing the rubber coating. Where the sponge rubber is to be produced continuously, the web after leaving the heating appliance is treated with an agent for disintegrating the fibers and then with a neutralizer for said agent, whereby the fibers will be disintegrated and the disintegration checked at the desired point, depending upon the percentage of fiber it is desired to remove. In the present illustration, the web is shown as first passing through a comparatively weak bath of sulphuric acid 14 and subsequently through a bath 15 of caustic soda. Preferably, the web is washed after passing through each of these baths, as by passing it through water baths 16, 17. After the last washing, the web may be passed between squeeze rolls 18, the action of which facilitates removal of the residue or ash of the dissolved fibers and softens the finished product. It will, of course, be understood that the nature of the filamentary element and the percentage thereof it is desired to remove will primarily determine the character or nature and the strength of the disintegrating agent and of the neutralizing bath. These factors will also determine the time element involved in subjecting the web to the individual baths. The porosity of the finished product is determined by the proportion of fibers removed. If all the fiber is removed, the product will naturally be more porous than if only part of said fibers is removed. In this connection, it should also be pointed out that the spongy characteristic of the product is also affected by the amount of ash or residue of fibers left in the rubber although all of that residue may be actually removed, if desired. Again, the porosity of the finished product can be varied by varying the density of the web of fibers, so as to form larger or smaller voids between the fibers. After the removal of the fibers or other filamentary elements, there remains a mass of rubber strands, generally of substantially tubular formation, cemented together in an intersticed relationship, the elongated voids or pores formed by said strands in conjunction with the voids or interstices between strands imparting the desired porosity to the mass or finished product. It will be appreciated that there will be instances where the surfaces of individual filaments or fibers are not completely coated with rubber, generally due to the water content of the latex bath. Thus, the tubular strands which remain after the filaments or fibers have been disintegrated may have a number of small perforations in their walls but, of course, this would only tend to increase the spongy characteristics of the finished material or article.

Preferably, the bath of the disintegrating agent and that of the neutralizing agent are heated and, if desired, these baths can be relied upon for vulcanizing the rubber coatings, thus dispensing with the vulcanizing or heating oven.

This method of producing sponge rubber has numerous advantages. The method renders it possible to produce sponge rubber in continuous lengths as distinguished from batch treatments. Due to the fact that the pores formed by the rubber coatings on the filamentary elements are of predetermined size or area in the sense that they are dependent upon and substantially conform to the size of the filaments or fibers used and the fact that the size or area of the voids between the several strands is controlled by or dependent upon the compactness with which those filaments are associated in the web, it is possible to form articles of the desired shape and size directly from the coated web and then treat the articles to dissolve and remove the desired percentage of fibers or other filamentary material without substantially affecting the contour of the articles. In other words, the nature of the present method is such that the size of the pores and voids are predetermined and regulable so that the article desired can be shaped before the mass is rendered porous. Preferably, the majority of filaments or fibers are disposed promiscuously or at random throughout the web, but it will be understood that their geometric pattern or arrangement can be varied, if desired, in the formation of the web and the particular pattern used will remain undisturbed in carrying out the present process, so that the disposition of the pores produced by the rubber coatings on said filaments is also predetermined.

With the present method it is also possible to form the web 10 with different portions possessing different degrees of density with the result that the sponge rubber produced therefrom will likewise have portions possessing correspondingly different degrees of porosity.

It will be observed that the present method renders it unnecessary to mold the material in a press to produce the sponge properties. It is also possible to form shapes of the material from the web by molding or click dies, either before or after the latex treatment, and the desired shapes of sponge rubber then produced by treating such formed shapes successively with the disintegrating agent and neutralizing agent.

The details of the specific method described here for purposes of illustration can, of course, be varied without departing from the fundamental principle of the present invention, which consists in forming a body of filamentary elements in intersticed relationship; coating the same with rubber; and, at least partially, disintegrating the filaments to form pores within the rubber coatings. As will be appreciated, different disintegrating agents, and neutralizers therefor, can be substituted for those specifically mentioned and, in some instances, an alkaline disintegrator and an acid neutralizer might be called for, depending upon the nature of the filaments used. In stating that the filaments are passed through a bath for coating them with rubber, it is intended that the bath may be of latex or rubber in any other form suitable for the purpose and, for this reason, references to coatings of uncured rubber or of rubber composition as used herein are to be broadly construed.

What we claim is:

The method of producing porous or sponge rubber which consists in associating a plurality of vegetable fibers into a self-sustaining body, said fibers being loosely compacted in said body whereby interstices are formed throughout the interior thereof, applying an aqueous dispersion of rubber to said fibers to coat them with rubber, successively subjecting the fibers to acid and alkaline baths to disintegrate at least a portion of the individual fibers and to check the disintegration thereof, and curing said rubber composition, the porosity or sponginess of the resulting product being dependent upon the intersticed relationship of the fibers in said self-sustaining mass and upon the extent to which said fibers are removed by treatment in said acid and alkaline baths.

KENNETH H. BOWEN.
LEONARD W. GANE.